US010050557B2

(12) United States Patent
Gao et al.

(10) Patent No.: US 10,050,557 B2
(45) Date of Patent: Aug. 14, 2018

(54) ENERGY HARVESTING APPARATUS AND A METHOD FOR OPERATING AN ENERGY HARVESTING APPARATUS

(71) Applicant: Agency for Science, Technology and Research, Singapore (SG)

(72) Inventors: Yuan Gao, Singapore (SG); I Made Darmayuda, Singapore (SG); San Jeow Cheng, Singapore (SG); Minkyu Je, Singapore (SG); Chun Huat Heng, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 302 days.

(21) Appl. No.: 14/020,976

(22) Filed: Sep. 9, 2013

(65) Prior Publication Data

US 2014/0071722 A1    Mar. 13, 2014

(30) Foreign Application Priority Data

Sep. 7, 2012  (SG) ................ 201206658-5

(51) Int. Cl.
*H02M 7/217* (2006.01)
*H02M 3/158* (2006.01)
*H02M 7/219* (2006.01)

(52) U.S. Cl.
CPC ....... *H02M 7/2176* (2013.01); *H02M 3/1582* (2013.01); *H02M 7/219* (2013.01)

(58) Field of Classification Search
CPC ... H02M 3/1582; H02M 7/219; H02M 7/2176
(Continued)

(56) References Cited

U.S. PATENT DOCUMENTS

| 5,929,690 A | 7/1999 | Williams |
| 8,138,735 B2 * | 3/2012 | Ivanov ............... H02M 1/36 |
| | | 323/284 |

(Continued)

FOREIGN PATENT DOCUMENTS

| WO | 2007048052 A2 | 4/2007 |
| WO | 2008100441 A2 | 8/2008 |
| WO | 2011115652 A1 | 9/2011 |

OTHER PUBLICATIONS

Search Report and Written Opinion for Singapore Patent Application No. 201306774-9 dated Oct. 22, 2014, pp. 1-12.
(Continued)

*Primary Examiner* — Jue Zhang
*Assistant Examiner* — Kevin H Sprenger
(74) *Attorney, Agent, or Firm* — Winstead, P.C.

(57) ABSTRACT

In various embodiments of the present disclosure, there is provided an energy harvesting apparatus, including: an energy harvester for generating electric power from an ambient source; a power conditioning circuit coupled to the output of the energy harvester; including: a boost converter module; a buck-boost converter module; and a power modification control module; wherein the power modification control module is configured to initialize the energy harvesting apparatus from inactivity to a normal energy harvesting state by operating the boost converter module, and operating the buck-boost converter when an output voltage of the power conditioning circuit rises to a predetermined value. A corresponding method of operating an energy harvesting apparatus is provided.

20 Claims, 8 Drawing Sheets

(58) Field of Classification Search
USPC ........ 323/237–241, 247, 259, 265–266, 268, 323/271, 282–285, 290, 311–314, 321; 363/74, 77–82, 125, 127
See application file for complete search history.

(56) References Cited

U.S. PATENT DOCUMENTS

| | | | | |
|---|---|---|---|---|
| 8,823,342 | B2* | 9/2014 | Williams | H02M 3/158 323/268 |
| 9,061,595 | B2* | 6/2015 | King | B60L 1/003 |
| 2009/0010035 | A1* | 1/2009 | Williams | H02M 3/1582 363/131 |
| 2010/0157638 | A1 | 6/2010 | Naiknaware et al. | |
| 2011/0156683 | A1* | 6/2011 | Zhang | H02M 3/1582 323/283 |
| 2011/0175461 | A1 | 7/2011 | Tinaphong | |
| 2011/0181258 | A1* | 7/2011 | Ivanov | G05F 1/575 323/282 |
| 2011/0227543 | A1* | 9/2011 | Ivanov | H02M 7/219 320/163 |
| 2011/0241625 | A1 | 10/2011 | LoCascio | |
| 2012/0293021 | A1* | 11/2012 | Teggatz | H02J 7/35 307/151 |
| 2014/0176106 | A1* | 6/2014 | Toosky | H02M 3/158 323/285 |
| 2015/0256078 | A1* | 9/2015 | Tanabe | H02M 3/1582 323/271 |

OTHER PUBLICATIONS

Darmayuda et al., "A Self-Powered Power Conditioning IC for Piezoelectric Energy Harvesting From Short-Duration Vibrations," IEEE Transactions on Circuits and Systems-II: Express Briefs, vol. 59, No. 9, Sep. 2012, pp. 578-582.

* cited by examiner

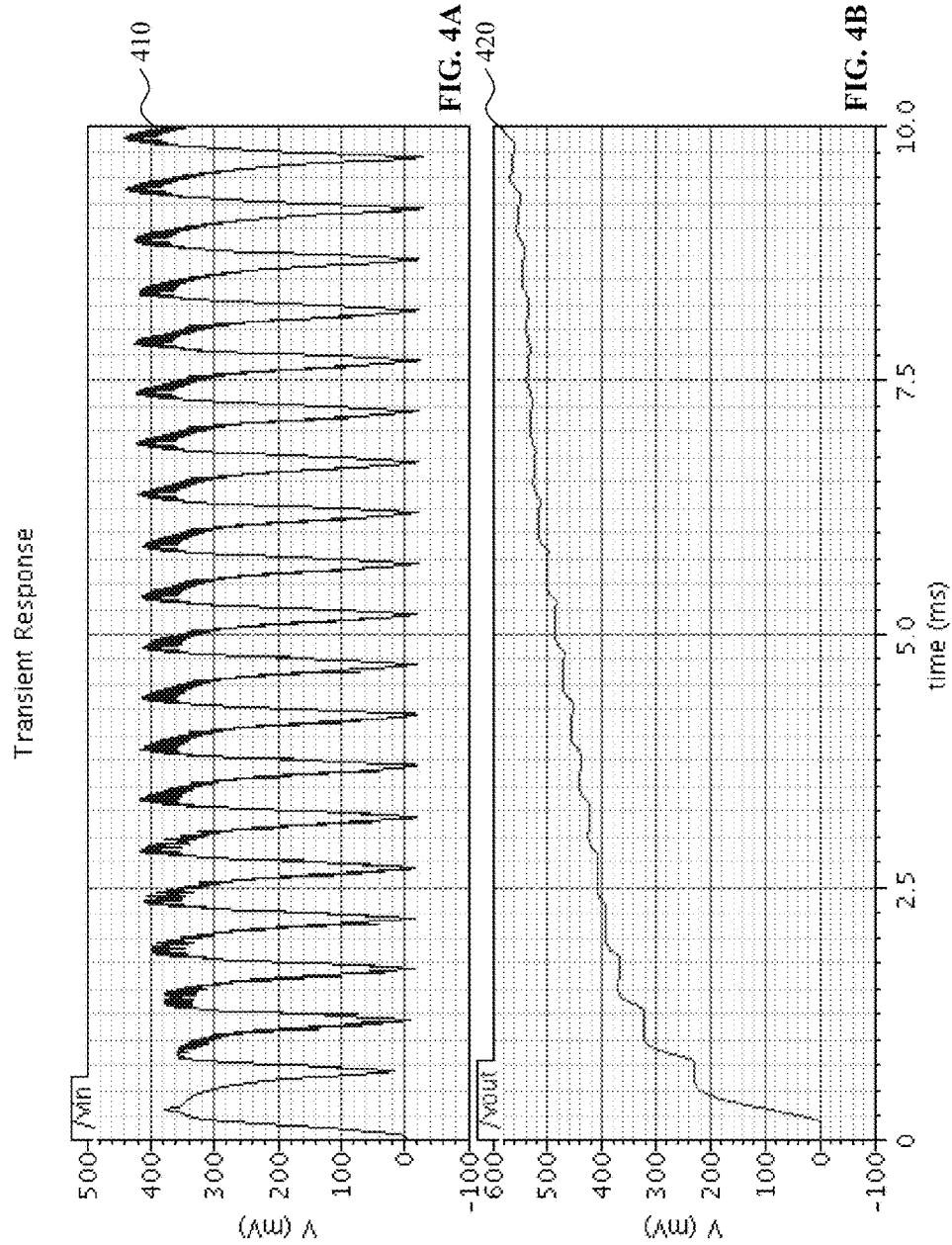

ENERGY HARVESTING APPARATUS AND A METHOD FOR OPERATING AN ENERGY HARVESTING APPARATUS

RELATED APPLICATIONS

This application claims the benefit of Singapore Patent Application no. 201206658-5, filed on 7 Sep. 2012. The disclosure of the above priority application is hereby incorporated by reference in its entirety.

TECHNICAL FIELD

The present disclosure describes embodiments generally relating to an energy harvesting apparatus and a method for operating an energy harvesting apparatus.

BACKGROUND

Energy autonomous sensors that harvest ambient energy from sources such as light, heat, vibration and radiation are promising solutions to provide long-term self-sustaining sensor operation without battery replacement. Among different ambient energy harvesting approaches, piezoelectric vibration energy harvesting attracts enormous research interest because of a relatively high energy density and a wide availability of environmental energy sources.

There have been different proposals and approaches to enhance the energy conversion efficiency of a piezoelectric energy harvester. To improve rectification efficiency, conventional MOS passive diodes have been proposed to be replaced with active diodes in significantly reducing forward voltage drop at the expense of additional comparator current. Switching converters have also been used to emulate optimum load resistance to achieve sub-optimum impedance matching for maximum power extraction. Nonlinear synchronized energy harvesting methods such as synchronized charge extraction (SCE) and synchronized switch harvesting on inductor (SSHI) are also explored to maximize output power.

However, the need of additional control and timing circuitries in the above proposals often require an external back-up energy source during start-up and this greatly reduces the self-startup capability of the energy harvester.

There is as such a desire for a piezoelectric energy harvester which provides an effective startup capability as well as rectification efficiency.

SUMMARY

According to various embodiments in the present disclosure, there is provided an energy harvesting apparatus, including: an energy harvester for generating electric power from an ambient source; a power conditioning circuit coupled to the output of the energy harvester; including: a boost converter module; a buck-boost converter module; and a power modification control module; wherein the power modification control module is configured to initialize the energy harvesting apparatus from inactivity to a normal energy harvesting state by operating the boost converter module, and operating the buck-boost converter when an output voltage of the power conditioning circuit rises to a predetermined value.

In various embodiments, there is provided a method for operating an energy harvesting apparatus, the energy generating apparatus including an energy harvester for generating electric power from an ambient source, the energy harvester coupled to a power conditioning circuit, including: initializing the energy harvesting apparatus from inactivity to a normal generation state, including: carrying out a boost converter function with the power conditioning module; and monitoring an output voltage of the power conditioning circuit; and switching from the boost converter function to a buck-boost converter function with the power conditioning module when the output voltage rises to a predetermined value.

BRIEF DESCRIPTION OF THE DRAWINGS

In the drawings, like reference characters generally refer to the same parts throughout the different views. The drawings are not necessarily to scale, with emphasis instead generally being placed upon illustrating the principles of the present disclosure. It is to be noted that the accompanying drawings illustrate only examples of embodiments of this disclosure and are therefore not to be considered limiting of its scope, for the disclosure may admit to other equally effective embodiments. In the following description, various embodiments of the disclosure are described with reference to the following drawings, in which:

FIGS. 4A and 4B illustrate a simulation made of an energy harvesting apparatus including an adaptive boost/buck-boost converter according to an embodiment.

DETAILED DESCRIPTION

Figure 1:
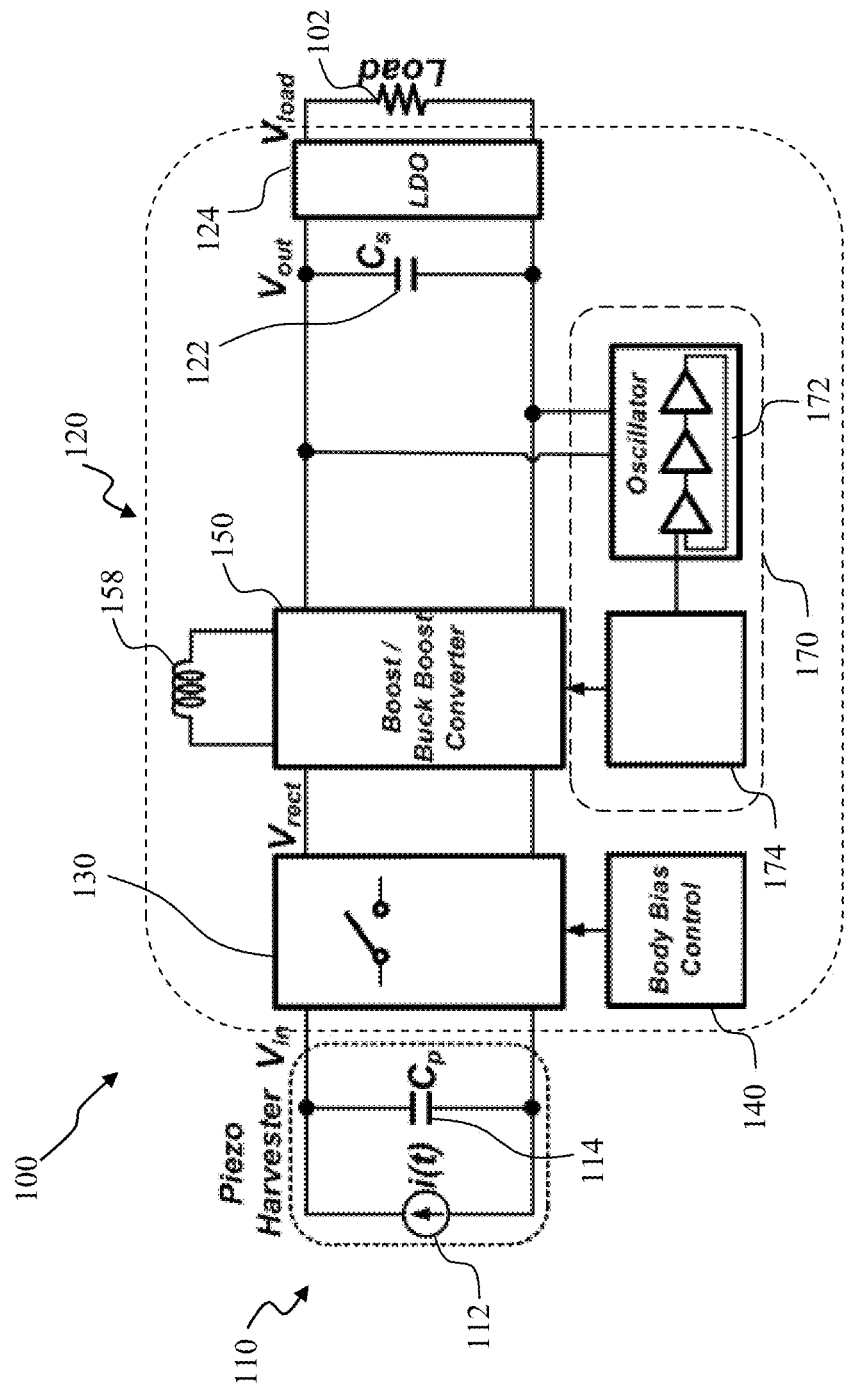
FIG. 1 illustrates a block diagram for an energy harvesting apparatus according to an embodiment.

Various forms of energy can be tapped or harvested from ambient environmental sources. Vibration is an example, and various known arrangements include utilizing a piezoelectric-based energy harvesting apparatus or energy generating apparatus. The energy harvesting apparatus is provided to a power conditioning circuit which rectifies and prepares the generated power for delivery to a determined load. Natural mechanical vibration is converted by a piezoelectric-based energy harvesting apparatus to electrical energy, and the output provided by the energy harvesting apparatus is an alternating current (AC) signal.

Conventional handling of such a low-powered AC energy generation includes a full-wave rectifier coupled with a Schottky diode to carry out the rectification. However, the technology for complementary metal oxide semiconductors (CMOS) has not progressed beyond where the Schottky can be fabricated in CMOS. As such, multiple available embodiments utilize a diode-connected CMOS transistor in place of a Schottky diode. Such a diode-connected CMOS transistor would have a gate-source threshold voltage of about 2 $V_{TH}$, which would be about 0.7V to 1 V depending on the CMOS fabrication process adopted.

According to various available embodiments, technological improvements have improved the performance of a passive CMOS rectifier emulating a Schottky diode. The threshold voltage for such a CMOS rectifier is provided as $V_{TH}+V_{DS}$.

In other various available embodiments, an alternative configuration of a negative voltage converter (NVC) formed by a plurality of transistors is provided to emulate a Schottky diode for rectification. The threshold voltage for such an arrangement is provided as 2 $V_{DS}$. However, it should be noted that the 2 $V_{DS}$ voltage drop only applies when the input swing is large enough to drive the semiconductor transistors into the saturation region, i.e. where the semiconductor switch is considered active. In such a situation, electrical current can flow freely from the collector to the emitter of the semiconductor transistor acting as a switch. If the input voltage amplitude is less than or just around the transistor threshold voltage, the conversion efficiency of the negative voltage converter arrangement drops significantly.

In various available embodiments, non-linear synchronized energy harvest techniques have been alternatively proposed. These methods can significantly improve energy harvesting efficiency in an energy harvester. However, the operation of such a circuit must be synchronized with the energy source, therefore a timing control circuit is required to monitor the input signal. In such a case, the monitoring has to be present even when no input is applied. Although various circuit techniques have been proposed to reduce the timing circuit power consumption, the fact remains that such a timing circuit is still necessary to operate the non-linear synchronized energy harvester, and in doing so, the continuous power consumption will adversely affect power generation. In particular, batteries powering the timing circuit will be drained, especially during a period of non-generation. Even when the energy harvester is generating power, the energy consumption of the timing circuit is increased when the conditioning circuit is operating in a bust mode.

As a result, it is presently recognized that amongst the available energy harvesters with power conditioning circuits with self-startup capability, a passive rectifier is still preferred for efficiency.

In various available embodiments, a body bias technique has been proposed in order to improve rectifier efficiency. In a power conditioning circuit of such proposal, corresponding PMOS transistors and NMOS transistors are provided in a NVC circuit arrangement. The CMOS transistor threshold voltage can be described as:

$$V_{th}=V_{th0}+\gamma(\sqrt{|2\phi_F-V_{BS}|}-\sqrt{|2\phi_F|}) \quad (1)$$

where $V_{th}$, is the threshold voltage, $V_{th0}$ is the threshold voltage for a zero substrate bias, $2\phi_F$ is the surface potential and $V_{BS}$ is the body-source terminal voltage. It is noted that $V_{th}$ can be reduced by increasing the body terminal voltage $V_{BS}$. A simple body bias circuit is proposed in various available embodiments by using a plurality of diode connected transistors to divide rectified output of the NVC which is then fed back to bias the transistor substrate.

It has been assessed by the inventors of the present disclosure that there are several limitations to a design of such proposal. For example, the power consumption of the diode-connected voltage divider will increase with the increase of input voltage. With a high input swing, the power consumption will be much larger. In the proposal, there is no provided consideration as to a cap or limit on the power consumption of the diode-connected voltage divider.

Further, due to the diode voltage drop, the body bias voltage of a PMOS transistor will be lower than the output voltage of the power conditioning rectifier, while the body bias voltage of a NMOS transistor is higher than the output voltage of the power conditioning rectifier when the threshold voltage drop is provided at one $V_T$. The $V_T$ voltage drop introduces a high leakage current through the body diode especially when the input voltage swing is high.

Embodiments of an energy generating apparatus and a method for operating an energy generating apparatus are described in detail below with reference to the accompanying figures. However, it should be understood that the disclosure is not limited to specific described embodiments. It will be appreciated that the embodiments described below can be modified in various aspects, features, and elements, without changing the essence of the disclosure. Further, any reference to various embodiments shall not be construed as a generalization of any inventive subject matter disclosed herein and shall not be considered to be an element or limitation of the appended claims except where explicitly recited in a claim(s).

According to various embodiments, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" herein means "and/or" unless specifically indicated otherwise.

The present disclosure can describe embodiments of a consumer electronic device which can be operable in various orientations, and it thus should be understood that any of the terms "top", "bottom", "base", "down", "sideways", "downwards" etc., when used in the following description are used for convenience and to aid understanding of relative positions or directions, and not intended to limit the orientation of the recording medium or a system or apparatus or product incorporating the recording medium.

A computing system or a controller or a microcontroller or any other system providing a processing capability can be presented according to various embodiments in the present disclosure. Such a system can be taken to include a processor. The system according to various embodiments can include a controller which may include a memory which is for example used in the processing carried out by portions of the receiver. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" is thusly defined as a portion of a system according to various embodiments in the present disclosure and may encompass a "circuit" as above, or may be understood to be any kind of a logic-implementing entity therefrom.

According to various embodiments, an energy harvesting apparatus is provided to tap on various forms of ambient energy, for example light, heat, vibration, or radiation energy, for conversion to electrical energy. In various embodiments, an energy harvesting apparatus is provided, wherein a kinetic energy source, in this case vibration, is tapped for conversion to electrical energy. In various embodiments, a piezoelectric-based energy harvesting apparatus is provided to tap on an ambient vibration source to convert kinetic energy to electrical energy.

FIG. 1 illustrates a block diagram for an energy harvesting apparatus according to an embodiment. Energy harvesting apparatus 100 is provided with a piezoelectric harvester 110 configured to convert kinetic energy to electrical energy. The piezoelectric harvester 110 includes a representative current source 112 which represents the generation of electrical energy from kinetic energy. In a piezoelectric device, mechanical strain is converted into electrical energy. In various embodiments, a piezoelectric material deforms and generates an electrical energy therefrom. In various embodiments, the piezoelectric material can be any one of a piezoelectric crystal, a piezoelectric biological material, a synthetic crystal, a synthetic ceramic, a polymer, a piezoceramic, or an organic nanostructure. In various embodiments, a micro-electronic mechanical system is provided for piezoelectric harvesting. Further, a conditioning capacitor $C_p$ 114 is provided for the smoothing of an alternating current (AC) electrical energy generated by the representative current source 112.

According to an embodiment, the output of the piezoelectric harvester 110 is provided to a power conditioning circuit 120. In an embodiment, the power conditioning circuit 120 includes a rectifier module 130 configured to receive the voltage output of the piezoelectric harvester 110 for rectification, in which the generated AC electrical energy is converted to a uni-directional direct current (DC) electrical energy. In an embodiment, the rectifier module 130 is an electrical circuit including a plurality of micro-controller controlled semiconductor switches. In an embodiment, the rectifier module 130 includes a negative voltage converter circuit (NVC) including a plurality of semiconductor switches for rectification of the generated electrical energy. A NVC provides for voltage rectification without a significant forward voltage drop. A In other embodiments, other methods of rectification can be provided.

In an embodiment, a body bias control module 140 is coupled to the rectifier module 130, to provide an improvement in efficiency for operation of the rectifier module. Further, the body bias control module 140 provides for an adaptive method of body bias for control of semiconductor switches which further improves the efficiency of the rectifier module 130. In an embodiment, the adaptive method of body bias allows for improved efficiency in sub-threshold voltage operation of the semiconductor switches of the rectifier module 130.

According to an embodiment, the power conditioning circuit includes a power modification module 150 for providing an adjustment to the electrical energy generated by the piezoelectric harvester 110. According to an embodiment, the power modification module 150 is coupled to an output of the rectifier module 130 and carries out a modification of the rectified generated power of the piezoelectric harvester. In an embodiment, the power modification module 150 includes an inductor 158. According to various embodiments, the inductor 158 provides an energy storage capability for the power modification module 150, allowing the power modification module 150 to correspondingly manipulate electrical energy received from the rectifier module 130.

Typically, vibrations can be understood to be a relatively small mechanical movement, generally oscillatory in nature. Further, the piezoelectric harvester of the present disclosure is intended to be relatively small and likewise, generates a relatively small electrical current, for example, for self-sustaining sensor applications, which include modest power requirements for operation. As such, a power modification module 150 is typically useful in providing an elevation of the generated electrical energy levels. According to various embodiments, the power modification module 150 can be a step-up transformer, an autotransformer, or a DC-DC converter which generates a higher output voltage magnitude.

According to an embodiment, a power modification control module 170 is provided in the power conditioning circuit 120 for the control of the power modification module 150. According to an embodiment, the power modification control module 170 includes an oscillator module 172 for the provision of variations in a control signal for controlling the activation or switching of semiconductor switches provided in the power modification module 150. The oscillator module 172 is useful especially in relation for configuration of the power modification module 150 in which a switched-mode power supply or a switching regulator is provided for efficient conversion or stepping up of the electrical power.

According to an embodiment, the power modification control module 170 includes a control modulation module 174 for communicating control signals to the power modification module 150. In an embodiment, the oscillator module 172 works in conjunction and is coupled to the control modulation module 174, where the control modulation module 174 receives control indications from the oscillator module 172, generates control signals and modulates the signals for operation or switching of semiconductor switches in the power modification module 150.

In an embodiment, the power conditioning circuit 120 further includes a storage capacitor $C_S$ 122 for receiving the generated electrical energy from the piezoelectric harvester 110. In an embodiment, the storage capacitor $C_S$ 122 is coupled to an output of the rectifier 130. In an embodiment, the storage capacitor $C_S$ 122 is coupled to an output of the power modification circuit 150. The storage capacitor $C_S$ 122 stores DC energy from piezoelectric harvester 110 and modified by the power modification circuit 150.

According to an embodiment, the energy stored by the storage capacitor $C_S$ 122 is thereafter used to power a low drop-out regulator (LDO) 124 in the power conditioning circuit 120. The LDO 124 provides a continuous regulated stable power supply for a load 102. The load 102 is representatively illustrated as a resistor module and can be any application to which the energy harvester 100 is coupled to. In various embodiments, the load 102 can be part of a sensor system which utilizes power generated from the energy harvester 100 for powering up and operation of the sensor system.

In an embodiment, the power conditioning circuit 120 includes a bandgap reference 126 which provides a stable reference voltage for all the active circuits. In embodiments, the bandgap reference 126 provides a stable reference voltage of the semiconductor switches utilized in the power conditioning circuit 120. In an embodiment, the bandgap reference 126 can be used for body bias control in a body bias control module for the efficient operation of a rectifier module.

Figure 2:
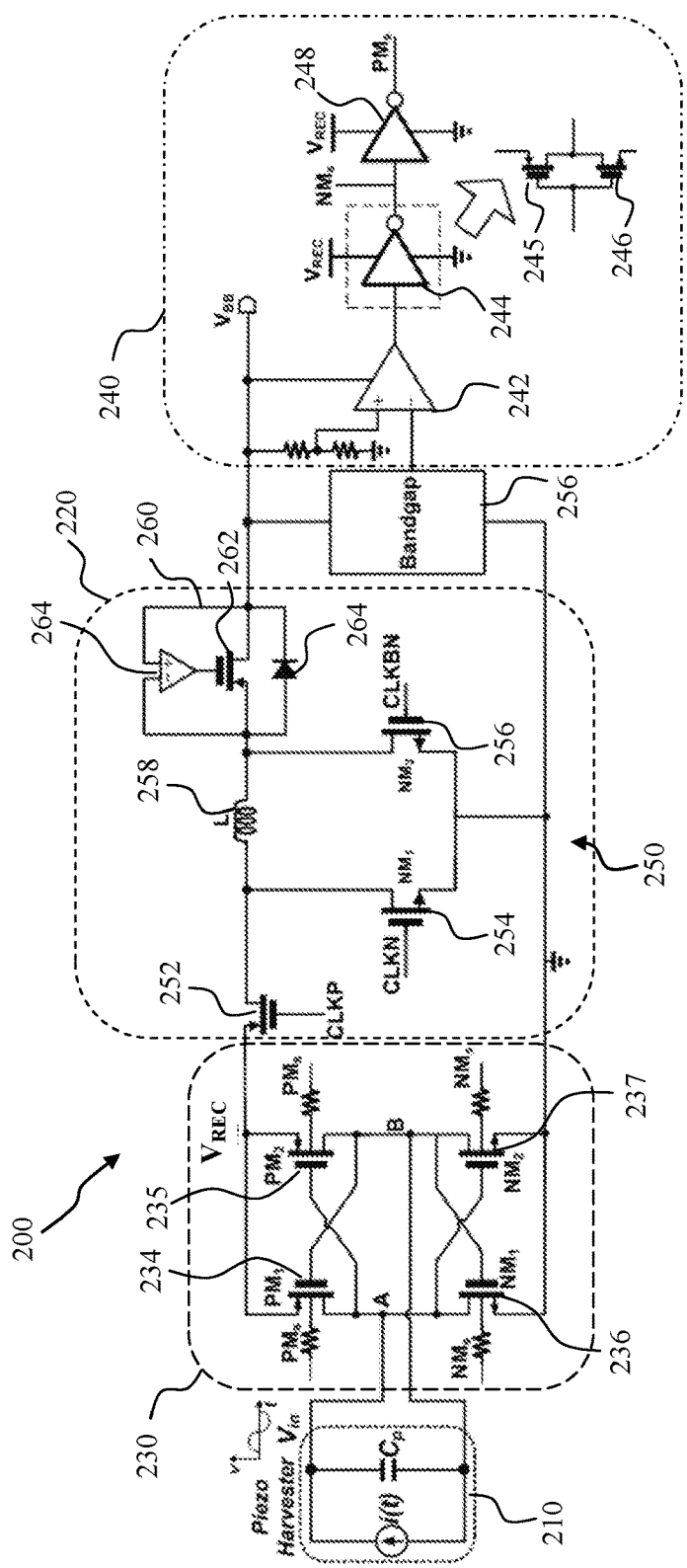
FIG. 2 illustrates a circuit diagram for an energy harvesting apparatus according to an embodiment.

FIG. 2 illustrates a circuit diagram for an energy harvesting apparatus according to an embodiment. According to an embodiment, an energy harvesting apparatus 200 is provided for the conversion of ambient vibrational mechanical energy to electrical energy, utilizing a piezoelectric harvester 210.

In an embodiment, the electrical energy generated by the piezoelectric harvester 210 is provided as a voltage output to a power conditioning circuit 220. In an embodiment, the power conditioning circuit 220 includes a rectifier 230. As mentioned above, it is presently recognized that amongst the available energy harvesters with power conditioning circuits with self-startup capability, a passive rectifier is still preferred for efficiency. The passive rectifier provides an initial charging path during the cold start-up period. From a comparison of the above available energy harvesting apparatuses, it is noted that the efficiency of the passive rectification circuit is of importance to the overall system efficiency. It has also been determined by the inventors of the present disclosure that a low input swing range in the provision of the passive rectification circuit is of importance to the overall system efficiency.

According to an embodiment, the rectifier 230 includes a plurality of semiconductor switches arranged as a negative voltage converter 232. As mentioned, the NVC provides voltage rectification without a significant forward voltage drop. In an embodiment, this advantage is made possible with the provision of a metal-oxide semiconductor (MOS) structure, instead of diode-connected transistors as provided in presently available energy harvesting apparatuses and as mentioned above. The provision of the MOS structure allows for a minimum forward voltage drop of $V_{TH}$.

In an embodiment, the NVC 232 receives a voltage output of the piezoelectric harvester 210. In an embodiment, a positive pole of the output of the piezoelectric harvester 210 is coupled to a point A on the NVC 232, while a negative pole of the output of the piezoelectric harvester 210 is coupled to a point B on the NVC 232. According to an embodiment, the NVC 232 seeks to reduce the diode forward voltage drop by including four cross-coupled switching transistors 234, 235, 236, 237. In various embodiments, the transistors are semiconductor transistors. In various embodiments, the transistors are any one of a bipolar transistor and a field effect transistor. In various embodiments, the transistors can be provided by any other usable semiconductor switches.

In an embodiment, two p-type metal oxide semiconductor (PMOS) transistors, $PM_1$ 234 and $PM_2$ 235 are provided and coupled to two n-type metal oxide semiconductor (NMOS) transistors, $NM_1$ 236 and $NM_2$ 237 to form a NVC 232. The coupling between the PMOS and the NOS transistors is provided as a cross-coupling.

According to an embodiment, during a positive half-cycle of current transmission, PMOS transistor $PM_1$ 234 and NMOS transistor $NM_2$ 237 turn on, current flows from A to the output via $PM_1$ 234 and returns to B via $NM_2$ 237. During the negative half cycle, $PM_2$ 235 and $NM_1$ 236 turn on, and the current PMOS body and NMOS body are tied to $V_{out+}$ and $V_{out-}$ respectively without any need of dynamic bulk regulation.

In providing a body bias capability for the rectifier module 230, a body bias control module 240 is provided and provides for an adaptive method of body bias for control of semiconductor switches in the rectifier module 230. According to an embodiment, the body bias control module 240 includes a plurality of simple inverter circuits. The output of the body bias control module 240 is a pair of reference voltages $PM_S$ and $NM_S$, in which are provided back to the rectifier module 220 for control of the semiconductor switches 234-237.

According to an embodiment, the body bias control module 240 includes an inverter circuit 244, which further includes a pair of transistors, a PMOS transistor 245 and an NMOS transistor 246 connected in series. In an embodiment, the source of the PMOS transistor 245 is provided with the output voltage of the rectifier $V_{REC}$. According to an embodiment, the source of the PMOS transistor 245 is connected with the output of the rectifier 230 $V_{REC}$ during the start-up period. In an embodiment, the source of the NMOS transistor 246 is connected to ground.

According to an embodiment, the body bias control module 240 further includes a second inverter circuit 248 similarly configured internally as the first inverter circuit 244. The internal NMOS and PMOS transistors are similarly connected as the NMOS and PMOS transistors in the first inverter circuit 244. The output of the first inverter circuit 244 is provided as the reference voltage $NM_S$, while the output of the second inverter circuit 248 is provided as the reference voltage $PM_S$, which is of course inverse to $NM_S$.

In an embodiment, the body bias control module 240 includes a comparator 242 which is used to compare the final output voltage of the power conditioning circuit $V_{BB}$ with a reference voltage provided by the voltage bandgap 226. When $V_{BB}$ is larger than the bandgap voltage, it indicates the input voltage from the piezoelectric harvester $V_{in}$, is large enough to cause the conduction of body diode, and the output of comparator 242 will flip such that the body of the PMOS transistor 244 will be connected to VREC and body of the NMOS transistor 245 will be connected to ground.

Providing such an adaptive body bias circuit can effectively reduce the transistor threshold voltage during startup of the energy harvesting apparatus. When input voltage is high enough, the body bias are switched back to normal operation to reduce leakage through body. This circuit can be fully powered by the input piezoelectric harvester energy source, and as such does not require the provision and support of an auxiliary battery.

In an embodiment, the power conditioning circuit 220 includes a power modification module 250 coupled to the output of the rectifier module 230 for modification of the rectified output of the generated electrical power from the piezoelectric module 210. In the embodiment, the power modification module 250 is configured to boost or elevate the output voltage levels for further application.

According an embodiment, a discontinuous conduction mode (DCM) combination boost/non-inverting buck-boost converter is provided as the power modification module. A DCM buck-boost converter behaves like a lossless impedance converter. By tuning its parameters, sub-optimal impedance for energy extraction can be synthesized regardless of the variation in loading condition. The DCM non-inverting buck-boost converter provides impedance matching for maximum energy extraction and output voltage boosting. In various embodiments, the power modification module includes a boost converter module and a buck-boost converter module. In various embodiments, the power modification module includes a boost converter module and a buck-boost converter module provided by separately configured semiconductor switches and components.

Compared to non-linear synchronized energy harvest methods proposed in certain available energy harvesting apparatuses, a DCM buck-boost converter utilizes a simpler architecture which consumes less power. It also has faster response to a pulse mode energy source. It is thus recognized by the inventors of the present disclosure that the DCM buck-boost converter and methods utilizing a DCM converter are more suitable for low power energy harvesting applications.

According to an embodiment, the combination boost/buck-boost converter 250 is provided by an arrangement of a plurality of transistors. A first PMOS transistor 252 is provided in series, and coupled at source, with an incoming voltage input $V_{REC}$ of the rectifier 230. The gate voltage of the PMOS transistor 252 is determined as input CLKP.

A further pair of NMOS transistors, 254 and 256, are provided in parallel and coupled at source and drain between voltage $V_{REC}$ and ground. The gate voltage of the NMOS transistors 254 and 256 are determined to be input CLKN and input CLKBN respectively. An inductor L 258 is coupled between the source connections of transistors 254 and 256.

Further an active diode 260 is coupled in series with the transistors 254 and 256. According to various embodiments, active diode 260 can include a PMOS transistor 262, a hysteresis comparator 264, and a diode 264 for conduction during a cold startup of the energy harvesting apparatus 200.

According to an embodiment, a power modification module including a reconfigurable boost/buck-boost converter is proposed to further improve the cold-start up operation and efficiency of the energy harvesting apparatus. The power modification module works in a boost mode during the cold start-up period to boost the output voltage.

As mentioned, a DCM buck boost converter can provide synthesized impedance to match with the energy source, i.e. the piezoelectric harvester 210. The input impedance $R_{IN}$ and input/output voltage $$\frac{V_{OUT}}{V_{IN}}$$

of the buck-boost converter in DCM mode is provided as:

$$R_{IN} = \frac{V_{IN}}{I_{AVG}} = \frac{2L}{D^2 T_S} \quad (2)$$

$$\frac{V_{OUT}}{V_{IN}} = D\sqrt{\frac{R_L T_S}{2L}} \quad (3)$$

From Equation (2), it can be observed that the input impedance $R_{IN}$ of the buck-boost converter is independent of the load and only dependent on the parameters of the buck-boost converter. From Equation (3), the voltage conversion ratio can be determined as being dependent on the load impedance $R_L$, clock period $T_s$, duty cycle D and inductor L.

According to an embodiment, it is proposed to utilize the power modification module 250 as a boost converter or a boost circuit during the cold start-up period. This is due to the boost converter having a higher voltage conversion ratio as compared with a to buck-boost converter. Due to the higher voltage conversion ratio, the system is able to self start-up with a lower input voltage. The input impedance $R_{IN}$ and the input/output voltage relationship M of a boost converter is provided as follows:

$$R_{IN} = \frac{V_{IN}}{I_{AVG}} = \frac{2L}{D^2 T_S}\left(\frac{M-1}{M}\right) \quad (4)$$

$$M = \frac{V_{OUT}}{V_{IN}} = \frac{1+\sqrt{1+\frac{4D^2 R_L T_S}{2L}}}{2} \approx \frac{1}{2} + D\sqrt{\frac{R_L T_S}{2L}} \quad (5)$$

It can be noted from Equation (5) that a boost converter can provide a higher output voltage compared to a buck-boost converter under the same loading conditions. However, Equation (4) indicates that the input impedance of a boost converter is linked with load resistance $R_L$ which may have large variation during operation. During the cold start-up period, the input impedance $R_{IN}$ of a boost converter is equal to the input impedance of a buck-boost converter. However, with an increase in the output voltage, the input impedance $R_{IN}$ of the boost converter will be affected. As such, control is taken to switch the power modification module 250 back to operating in a buck-boost mode, in order to isolate the input and output.

According to an embodiment, a power modification module 250 including a reconfigurable boost/buck-boost converter is provided to further improve the cold-start up operation and efficiency of the energy harvesting apparatus 200. The power modification module 250 works in a boost mode during a cold start-up period to boost the output voltage. When the voltage on the storage capacitor 122 is above a certain threshold, the system will switch to a buck-boost mode, so that the power conditioning circuit input impedance will be decoupled from the load condition. This switching architecture helps to reduce the start-up voltage of the system while maintaining the conversion efficiency.

Figure 3:
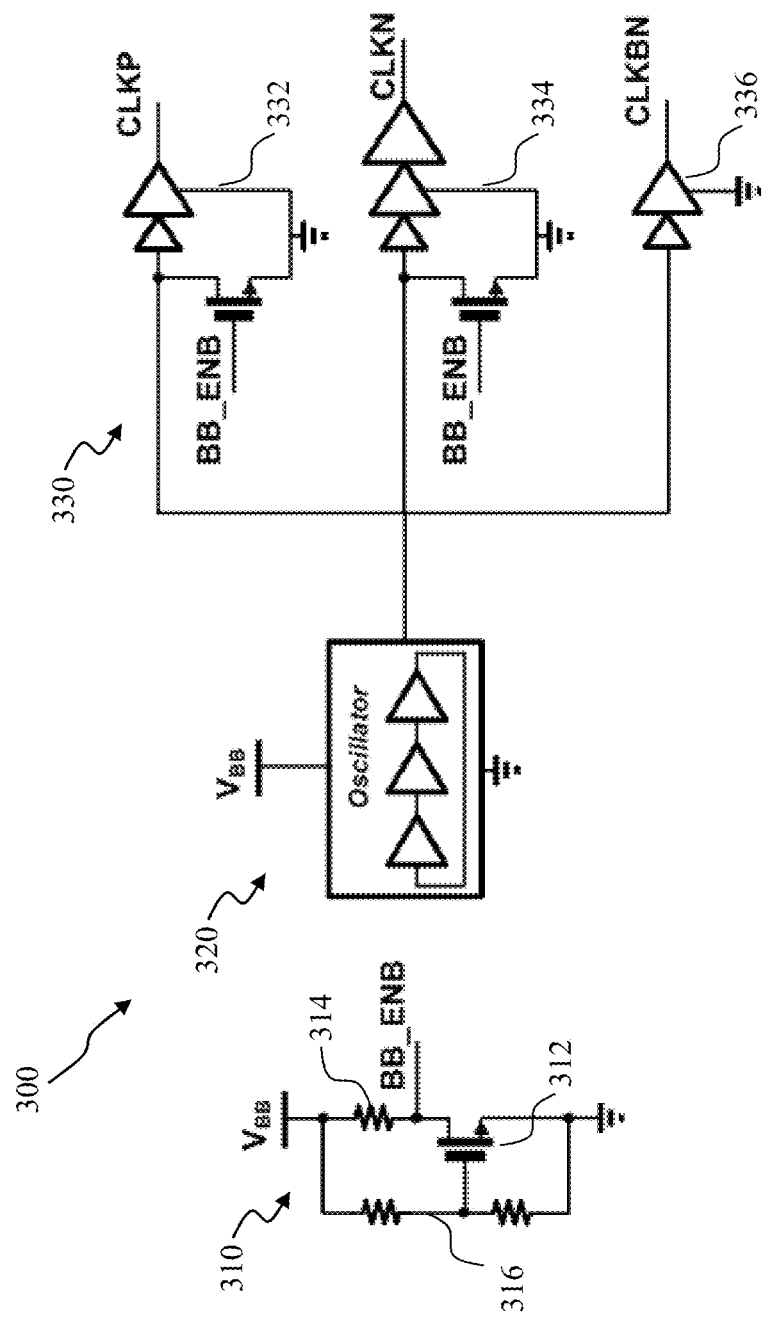
FIG. 3 illustrates a schematic of a power modification control module according to an embodiment.

FIG. 3 illustrates a schematic of a power modification control module according to an embodiment. According to an embodiment, the power modification control module 300 is coupled to the power modification module 250 and provides control signals and switching instructions for the semiconductor switches in the power modification module 250.

According to an embodiment, the power modification control module 300 includes a plurality of sub-modules for control operation. According to an embodiment, the power modification control module 300 includes three sub-modules for control operation of the power modification module 250.

In an embodiment, the power modification control module 300 includes a driver sub-module 310 to control the driving amplifiers of the non-inverting buck-boost converter provided in the power modification module 250. In driver sub-module 310, a transistor 312 is provided. In an embodiment, the driver sub-module 310 includes a MOSFET 312 as control switch. In an embodiment, the driver sub-module 310 includes a NMOS transistor 312 as control switch. The transistor 312 can be coupled at a source terminal to electrical ground, and can be coupled at a drain terminal through a resistor 314 to an output voltage $V_{BB}$ of the energy harvester 200. Further, the transistor 312 is coupled at a gate input to a voltage divider 316. According to an embodiment, the voltage divider 316 is provided to allow for the transistor to be active at a certain predetermined input voltage levels In various embodiments, the predetermined voltage levels vary for various applications of the energy harvesting apparatus 200 and as well as for various circuit embodiments of the energy harvesting apparatus. According to an embodiment, the defining the predetermined input voltage level includes a carrying out multiple iterations of pre-application testing in order to ascertain the most efficient predetermined input voltage level for which allows the switching of the transistor 312. In an embodiment, the driver sub-module 310 is configured to output a driving signal BB_ENB when the threshold voltage of the voltage divider 316 rises to a power modification control voltage.

According to an embodiment, the power modification control module 300 includes an oscillator sub-module 320 to provide a variation of the received input voltage. In an embodiment, the oscillator sub-module 320 produces a repetitive oscillating signal from the input DC rectifier signal $V_{REC}$. In an embodiment, the oscillator sub-module 320 produces a square wave signal from the input DC rectifier signal $V_{REC}$. In an embodiment, the oscillator sub-module 320 can be provided as coupled to the output voltage of the energy harvesting apparatus 200. According to an embodiment, the oscillator is a three-stage duty cycled ring oscillator.

In various embodiments, the oscillator sub-module 320 is provided separately from the power modification control module 300 and provides oscillation of the input voltage to the oscillator sub-module, being the output of the energy harvesting apparatus, in particular, the output of the power modification module 250.

According to an embodiment, the power modification control module 300 includes a converter clock control sub-module 330. The converter clock control sub-module 330 is configured to receive an output waveform from the oscillator sub-module and provides an input signal for the control of the semiconductor switches provided in the power modification module 250. In an embodiment, the clock controlled converter sub-module 330 includes three branches for the determination of three input signals for the three transistors 252, 254, 256 in the combination boost/buck-boost converter of the power modification module 250.

In an embodiment, a first branch includes a control circuit 332 for the provision of a control signal CLKP for the control of transistor 252. The control circuit 332 includes a transistor controlled circuit that is dependent on the output of the driver sub-module 310, BB_ENB for activation.

In an embodiment, a second branch includes a control circuit 334 for the provision of a control signal CLKN for the control of transistor 254. The control circuit 334 includes a transistor controlled circuit that is dependent on the output of the driver sub-module 310, BB_ENB for activation.

In an embodiment, a third branch includes a control circuit 336 for the provision of a control signal CLKBN for the control of transistor 256. The control circuit 336 receives a direct input from the oscillator sub-module 320 and can be considered active with respect with the input signal.

According to various embodiments, the output of the converter clock control sub-module 330 is provided to a control modulation module for converting and communicating control signals to the power modification module for effective control.

According to various embodiments, the power modification control module 300 is configured to carry out a method of operating the energy harvesting apparatus. According to an embodiment, the power modification control module 300 is configured to carry out a method of adaptive switching between a boost and a buck-boost function in operating the energy harvesting apparatus.

During start-up of the energy harvesting apparatus circuit, the signal BB_ENB, which is the output from the driver sub-module 310, rises with the output of the power conditioning circuit 220 $V_{BB}$. Provision of signal BB_ENB to control circuit 332 and 334 will force the CLKP and CLKN signals to ground. This leads to the transistors 252 and 254 in the power modification module 250 to be in an "on" and "open" state respectively. As a result, the power modification module 250 is configured such that the combination boost/non-inverting buck boost circuit is working as a boost converter.

As the output voltage $V_{BB}$ of the power conditioning circuit 220 of the energy harvesting apparatus 200 continues to rise, the voltage surpasses a predetermined threshold as provided and set in accordance to the resistive ratio in voltage divider 316 of the driver circuit. This predetermined threshold can be set to where the power conditioning circuit 220 of the energy harvesting apparatus 200 provides an output which takes the circuit out of a cold start-up stage into a normal operating state. Once the threshold is surpassed, the transistor 312 is activated and the source and drain terminals of the transistor can be considered to be shorted.

In turning on the control transistor 312, BB_ENB will be shorted to GND, and in doing so, the input signals CLKP and CLKN are enabled with the activation of transistors 332 and 334. In such a case, the combination boost/buck boost converter will work as a buck-boost converter.

FIGS. 4A and 4B illustrate a simulation made of an energy harvesting apparatus including an adaptive boost/buck-boost converter according to an embodiment. Plot 410 in FIG. 4A shows the voltage output $V_{BB}$ of the power conditioning circuit 220 of the energy harvesting apparatus. It can be noted that in the cold-start up region in 410, where the piezoelectric harvester initiates energy conversion and generation, and the electrical energy generated is rectified and provided to the power modification module 250 including a combination boost/buck-boost converter for stepping up, the power modification module 250 of an embodiment is able to start up and output a desirable operating waveform.

Plot 420 in FIG. 4B shows the voltage built up over the storage capacitor $C_S$ 122. It can be observed that the capacitor 122 receives a stable input from the power conditioning circuit 220 which provides for a steady build up of charge in the capacitor.

Figure 5A:
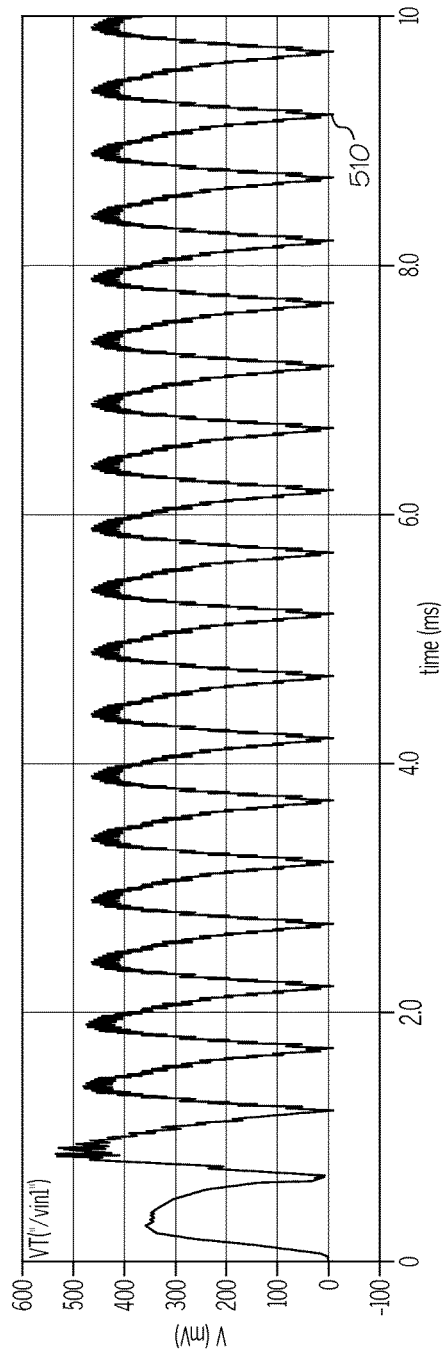
FIGS. 5A and 5B illustrate a simulation made of a presently available energy harvesting apparatus with a buck-boost converter.
Figure 5B:
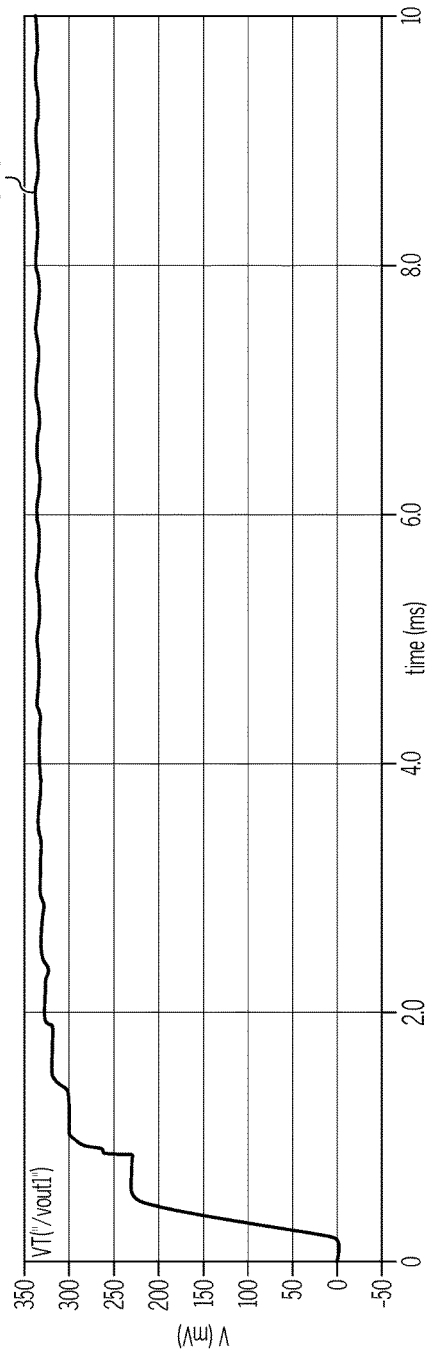

FIGS. 5A and 5B illustrate a simulation made of a presently available energy harvesting apparatus with a buck-boost converter. The simulation readings are provided as a comparison with the simulations made of an energy harvesting apparatus of an embodiment according to the present disclosure. Plot 510 in FIG. 5A shows the voltage output of the buck-boost converter configured to receive a rectified electrical current as generated with a piezoelectric harvester. Plot 520 in FIG. 5B shows the voltage built up over a storage capacitor coupled to the buck-boost converter in the presently available energy harvesting apparatus.

It can be observed from 510 that the buck-boost converter of the presently available energy harvesting apparatus is unable to initiate or start-up correctly with an input voltage of 0.4V as the entire circuit falls into a deadlock. No such limitations or drawbacks are observed in 410 with the combination boost/buck-boost converter of a power modification module of an energy harvesting apparatus in a present embodiment. Further, it can also be observed from 420 that with a combination boost/buck-boost converter according to an embodiment of the present disclosure, the storage capacitor $C_S$ is able to be charged up to a much higher voltage.

Figure 6:
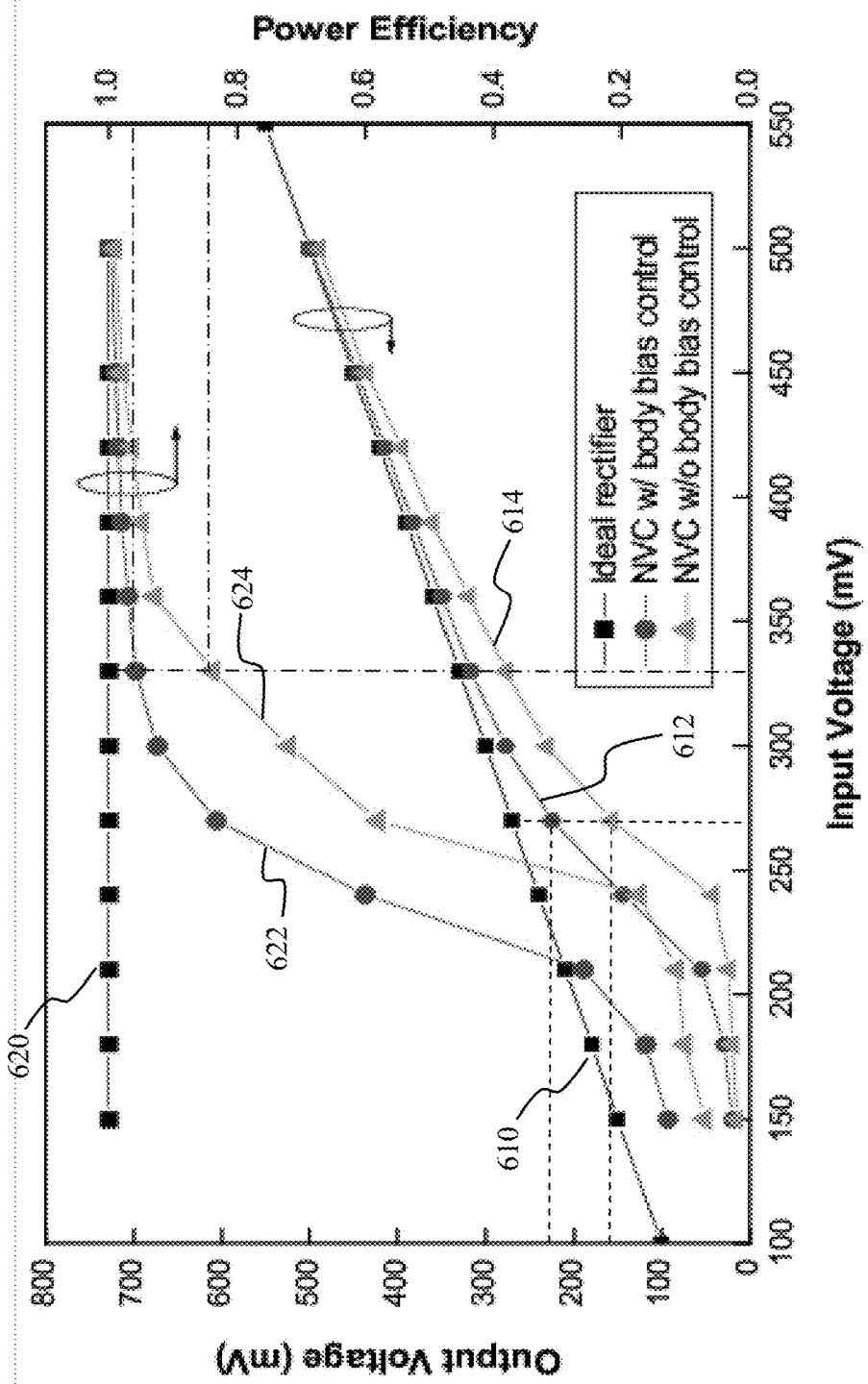
FIG. 6 illustrates the voltage input/output relationship and the efficiency of the rectifier according to an embodiment.

FIG. 6 illustrates the voltage input/output relationship and the efficiency of the rectifier according to an embodiment. FIG. 6 provides results of experimental measurements carried out on embodiments manufactured with a 65 nm CMOS process. According to various embodiments, the rectifier can also be fabricated in accordance to other processes, for example, a 0.18 μm 24V IC process, or any other process which can be considered suitable to achieve the intended purpose. Plot 610 indicates the characteristics and the efficiency of a theoretically ideal rectifier. It can be observed that for an ideal rectifier, an input voltage would incur no loss and would equate to a similar output voltage. Plot 612 shows the voltage input/output relationship of a rectifier provided with a body bias according to an embodiment of the present disclosure. Plot 614 shows the voltage relationship of a rectifier without a body bias. Both plots 612 and 614 can be obtained by experimental measurements of embodiments.

From 614, for an NVC without body bias, the circuit starts to conduct at about 0.2V, but as the transistors work in the sub-threshold region as input voltage amplitude is below 500 mV, the voltage drop is much higher than 2 $V_{DS}$. When input voltage is above 500 mV, transistors enter into saturation region, the forward voltage drop quickly reduces to 2 $V_{DS}$. From 612, with body bias according to an embodiment in the present disclosure, the body bias can help to reduce the transistor threshold, so that the conversion efficiency in the region of sub-threshold region can be enhanced significantly.

It can be observed that the provision of body bias according to an embodiment of the present disclosure allows for the improvement of voltage conversion efficiency. For example, at $V_{in}$=270 mV, and from 612 and 614, there is shown an increase in voltage conversion efficiency, i.e. $V_{out}/V_{in}$, from 55% to 82%.

Plot 620 indicates the characteristics and the efficiency of a theoretically ideal rectifier. As can be observed, a theoretically ideal rectifier operates at a theoretically ideal efficiency of 1. Plot 622 shows the power efficiency of a rectifier provided with a body bias control according to an embodiment. Plot 624 shows the power efficiency of a rectifier without a body bias control It can thus be observed that the provision of body bias according to an embodiment of the present disclosure allows for the improvement of conversion power efficiency. For example, at $V_{in}$=300 mV, and from 622 and 624, there is shown an increase in conversion power efficiency from 0.82 to 0.92.

Figure 7:
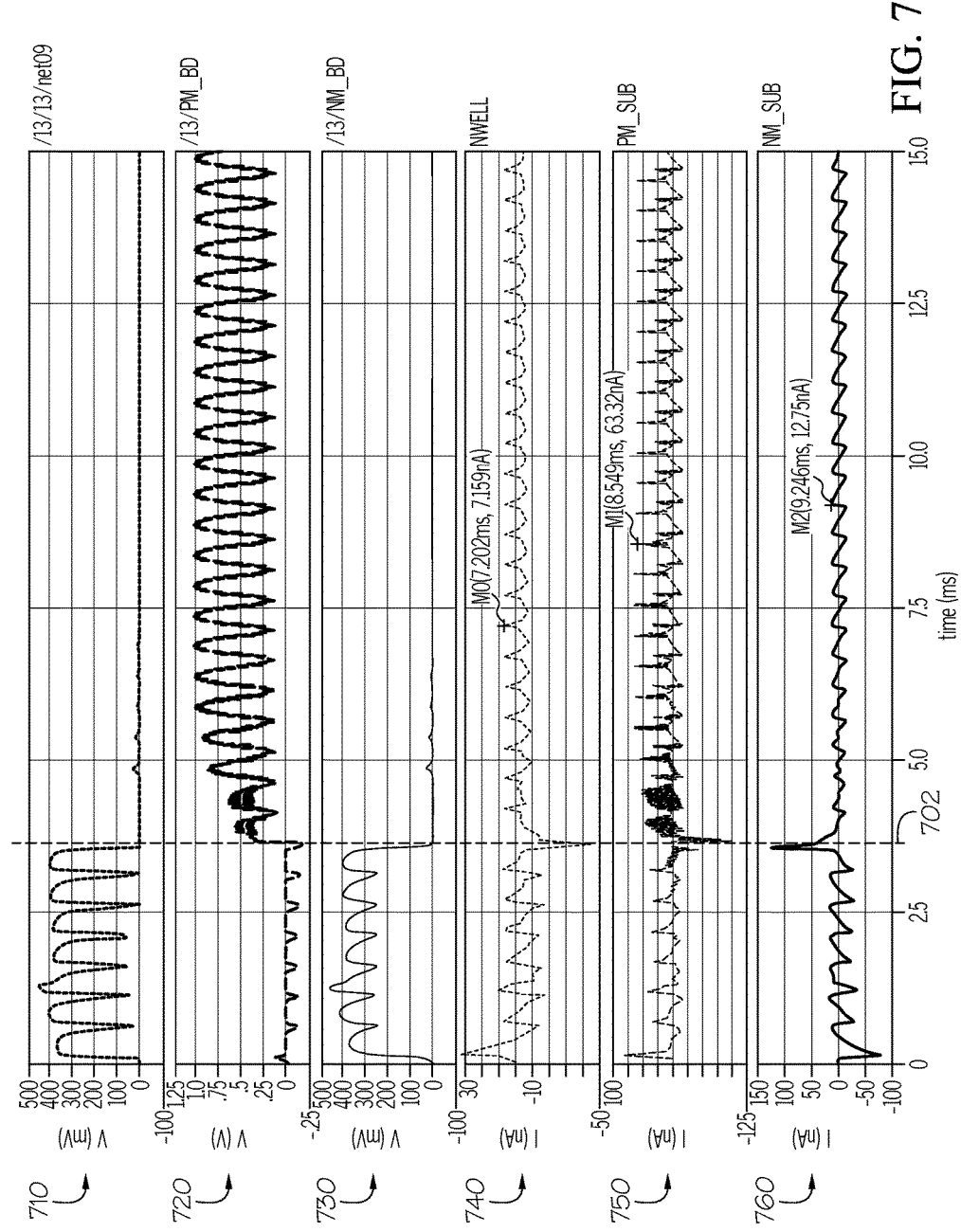
FIG. 7 illustrates a time domain transient response of a rectifier with according to an embodiment.

FIG. 7 illustrates a time domain transient response of a rectifier according to an embodiment. In the embodiment, a rectifier is provided with a body bias control module for adaptive body bias switching. According to an embodiment, the rectifier can be provided with a 2 MΩ substrate bias resistor. Plot 710 shows an output of comparator 242, which monitors the voltage output of the power conditioning circuit compares the voltage output with the bandgap voltage. Plot 720 shows a PMOS sub-bias voltage. Plot 730 shows a NMOS sub-bias voltage. Plot 740 shows an N-well current. Plot 750 shows a PMOS substrate current and plot 760 shows an NMOS substrate current.

The body bias switching can clearly be observed from the various plots and is further accentuated by line 702. It can also be observed from 750 and 760 that the current flowing through the substrate is slightly lower after the body bias switching.

Figure 8:
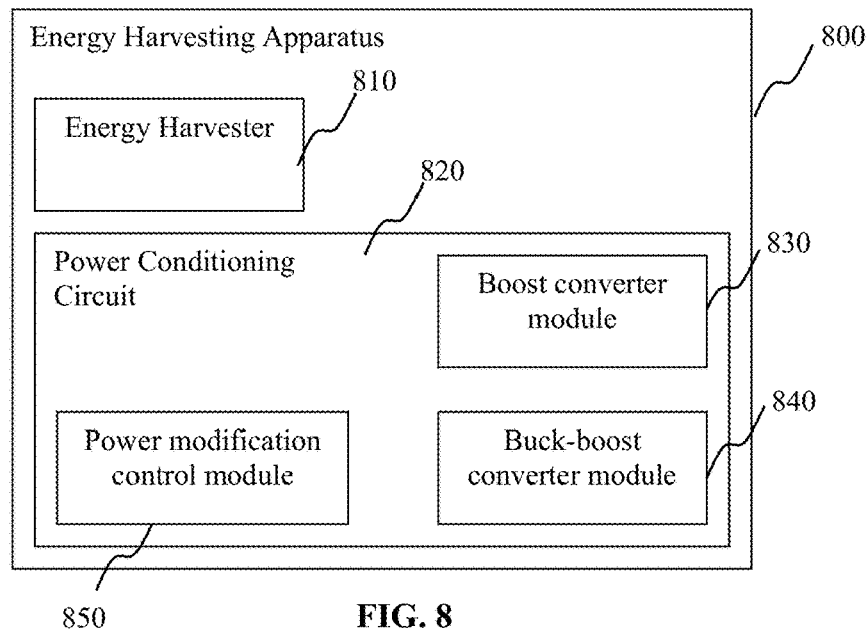
FIG. 8 illustrates a block schematic of an energy harvesting apparatus according to an embodiment of the present disclosure.

FIG. 8 illustrates a block schematic of an energy harvesting apparatus according to an embodiment of the present disclosure. According to an embodiment, there is provided an energy harvesting apparatus 800. The energy harvesting apparatus 800 includes an energy harvester 810 for generating electric power from an ambient source. A power conditioning circuit 820 is provided, and coupled to the output of the energy harvester 810. The power conditioning circuit 820 includes a boost converter module 830, a buck-boost converter module 840, and a power modification control module 850. According to an embodiment, the power modification control module is configured to initialize the energy harvesting apparatus from inactivity to a normal energy harvesting state by operating the boost converter module, and operating the buck-boost converter when an output voltage of the power conditioning circuit rises to a predetermined value.

In an embodiment, the power modification control module includes a voltage driver module further including a voltage divider coupled to a semiconductor switch.

In an embodiment, the voltage divider includes a pair of resistors arranged to activate the semiconductor switch when the output voltage rises to the predetermined value.

In an embodiment, the energy harvesting apparatus further includes a converter control module configured to receive a driving signal from the voltage driver module and manipulate semiconductor switches for operating any one of the boost converter module and the buck-boost converter module.

In an embodiment, the energy harvesting apparatus further includes an oscillator module configured to provide a waveform variation for operating any one of the boost converter module and the buck-boost converter module.

In an embodiment, the power conditioning module includes a combined boost/buck-boost converter arrangement configured to operate as any one of the boost converter module and the buck-boost converter module at any time.

In an embodiment, the energy harvesting apparatus further includes a rectifier coupled to the energy harvester, the rectifier including a plurality of semiconductor switches; and a body bias control module configured to lower a threshold voltage of at least one of the plurality of semiconductor switches.

In an embodiment, the plurality of semiconductor switches includes any one of P-type semiconductor switches and N-type semiconductor switches, and the body bias control module is configured to connect a body of the P-type semiconductor switches to electrical ground, and to connect a body of the N-type semiconductor switches to a reference voltage.

In an embodiment, the body bias control module includes a comparator configured to compare the output voltage of the power conditioning circuit to a bandgap voltage.

In an embodiment, the body bias control module connects the body of the P-type semiconductor switches to the reference voltage, and connects the body of the N-type semiconductor switches to electrical ground, when the output voltage of the power conditioning circuit is larger than the bandgap voltage.

Figure 9:
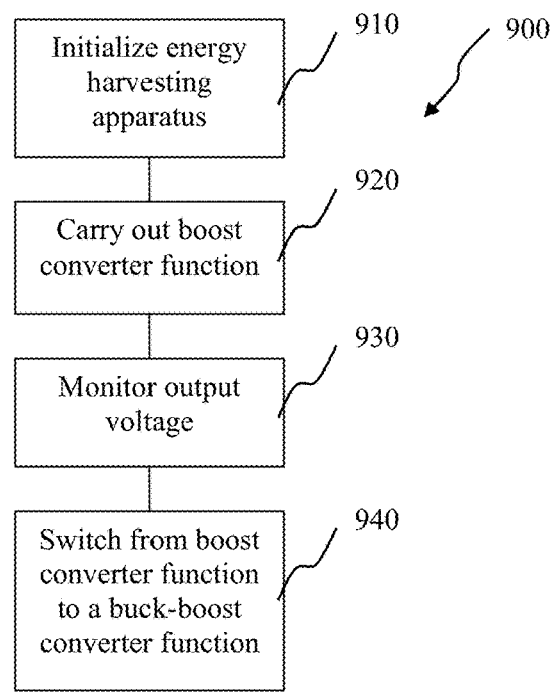
FIG. 9 illustrates a block diagram of a method according to an embodiment of the present disclosure.

FIG. 9 illustrates a block diagram of a method 900 according to an embodiment of the present disclosure. Method 900 can be a method of operating an energy harvesting apparatus. According to an embodiment, the energy generating apparatus includes an energy harvester for generating electric power from an ambient source, and the energy harvester is coupled to a power conditioning circuit. In 910, the method can include initializing the energy harvesting apparatus from inactivity to a normal generation state. In 920, the method can include carrying out a boost converter function with the power conditioning module. In 930, the method can include monitoring an output voltage of the power conditioning circuit. In 940, the method can include switching from the boost converter function to a buck-boost converter function with the power conditioning module when the output voltage rises to a predetermined value.

In an embodiment, the method includes monitoring the output voltage and switching from the boost converter function to a buck-boost converter function with a voltage driver module including a voltage divider coupled to a semiconductor switch.

In an embodiment, the method includes activating the semiconductor switch when a voltage drop across a resistor in the voltage divider rises to the predetermined value.

In an embodiment, the method includes receiving a driving signal from the voltage driver module and manipulating semiconductor switches for operating any one of the boost converter function and the buck-boost converter function.

In an embodiment, the method includes providing a waveform variation for operating any one of the boost converter function and the buck-boost converter function with an oscillator module.

the method includes manipulating a combined boost/buck-boost converter arrangement to operate any one of the boost converter function and the buck-boost converter function with an oscillator module.

In an embodiment, the energy harvesting apparatus includes a rectifier coupled to the energy harvester, the rectifier including a plurality of semiconductor switches, the method can include: lowering a threshold voltage of at least one of the plurality of semiconductor switches with a body bias control module.

In an embodiment, the plurality of semiconductor switches includes any one of P-type semiconductor switches and N-type semiconductor switches, the method can include: connecting a body of the P-type semiconductor switches to electrical ground; and connecting a body of the N-type semiconductor switches to a reference voltage.

In an embodiment, the method includes comparing the output voltage of the power conditioning circuit to a bandgap voltage.

In an embodiment, the method further includes determining when the output voltage of the power conditioning circuit is larger than the bandgap voltage; connecting the body of the P-type semiconductor switches to the reference voltage; and connecting the body of the N-type semiconductor switches to electrical ground.

The above apparatus, method and/or system as described and illustrated in the corresponding figures, is not intended to limit an or any apparatus, method or system as according to an embodiment, and the scope of the present disclosure. The description further includes, either explicitly or implicitly, various features and advantages of the method or system according to the present disclosure, which can be encompassed within an apparatus, method or system according to the disclosure.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. An energy harvesting apparatus, comprising:
   an energy harvester for generating electric power from an ambient source;
   a power conditioning circuit coupled to the output of the energy harvester;
   comprising:
      a reconfigurable boost/buck-boost converter module configured to switch between a boost converter mode and a buck-boost converter mode; and
      a power modification control module comprising a voltage driver module;
   wherein the power modification control module is configured to initialize the energy harvesting apparatus from a non-powered state to a normal energy harvesting state by operating the reconfigurable boost/buck-boost converter module in the boost converter mode, and to operate the reconfigurable boost/buck-boost converter module in the buck-boost converter mode when an output voltage of the power conditioning circuit rises to a predetermined value;
   wherein the reconfigurable boost/buck-boost converter module of the power conditioning circuit comprises a plurality of semiconductor switches and an inductor, the inductor having a first terminal connected to a first group of the plurality of semiconductor switches and a second terminal connected to a second group of the plurality of semiconductor switches, and the reconfigurable boost/buck-boost converter module is switchable between the boost converter mode and the buck-boost converter mode by controlled switching of the plurality of semiconductor switches;
   wherein the first group of the plurality of semiconductor switches comprises a first P-type semiconductor switch and a first N-type semiconductor switch, wherein a control terminal of the first P-type semiconductor switch is controlled by a first control signal, and a control terminal of the first N-type semiconductor switch is controlled by a second control signal, wherein the first control signal and the second control signal are different control signals, wherein the first control signal and the second control signal are dependent on a driving signal from the voltage driver module;
   wherein the second group of the plurality of semiconductor switches comprises a second P-type semiconductor switch and a second N-type semiconductor switch, wherein a control terminal of the second P-type semiconductor switch is controlled by a third control signal, and a control terminal of the second N-type semiconductor switch is controlled by a fourth control signal, wherein the third control signal and the fourth control signal are different control signals, wherein the fourth control signal is independent of the driving signal from the voltage driver module.

2. The energy harvesting apparatus of claim 1, wherein the voltage driver module further comprising a voltage divider coupled to a semiconductor switch.

3. The energy harvesting apparatus according to claim 2, wherein the voltage divider comprises a pair of resistors arranged to activate the semiconductor switch of the voltage driver module when the output voltage rises to the predetermined value.

4. The energy harvesting apparatus according to claim 2, further comprising a converter control module configured to receive the driving signal from the voltage driver module and manipulate the plurality of semiconductor switches of the reconfigurable boost/buck-boost converter module for operating the reconfigurable boost/buck-boost converter module in any one of the boost converter mode and the buck-boost converter mode.

5. The energy harvesting apparatus according to claim 2, further comprising an oscillator module configured to provide a waveform variation for operating the reconfigurable boost/buck-boost converter module in any one of the boost converter mode and the buck-boost converter mode.

6. The energy harvesting apparatus according to claim 1, further comprising:
a rectifier coupled to the energy harvester, the rectifier comprising a second plurality of semiconductor switches; and
a body bias control module configured to lower a threshold voltage of at least one of the second plurality of semiconductor switches of the rectifier.

7. The energy harvesting apparatus according to claim 6, wherein the second plurality of semiconductor switches of the rectifier comprises any one of P-type semiconductor switches and N-type semiconductor switches, and the body bias control module is configured to connect a body of the P-type semiconductor switches to electrical ground, and to connect a body of the N-type semiconductor switches to a reference voltage.

8. The energy harvesting apparatus according to claim 7, wherein the body bias control module comprises a comparator configured to compare the output voltage of the power conditioning circuit to a bandgap voltage.

9. The energy harvesting apparatus according to claim 8, wherein the body bias control module connects the body of the P-type semiconductor switches to the reference voltage, and connects the body of the N-type semiconductor switches to electrical ground, when the output voltage of the power conditioning circuit is larger than the bandgap voltage.

10. The energy harvesting apparatus of claim 1,
wherein the first P-type semiconductor switch is connected between the first terminal of the inductor and the output of the energy harvester, and the first N-type semiconductor switch is connected between the first terminal of the inductor and electrical ground;
wherein the second P-type semiconductor switch is connected between the second terminal of the inductor and an output of the power conditioning circuit, and the second N-type semiconductor switch is connected between the second terminal of the inductor and electrical ground;
wherein the reconfigurable boost/buck-boost converter module further comprises a hysteresis comparator and a diode in parallel connection with the second P-type semiconductor switch.

11. A method for operating an energy harvesting apparatus, the method comprising:
initializing the energy harvesting apparatus from a non-powered state to a normal generation state, the energy harvesting apparatus comprising an energy harvester for generating electric power from an ambient source, the energy harvester coupled to a power conditioning circuit, the power conditioning circuit comprising a reconfigurable boost/buck-boost converter and a power modification control module comprising a voltage driver module, the reconfigurable boost/buck-boost converter configured to switch between a boost converter function and a buck-boost converter function, the reconfigurable boost/buck-boost converter of the power conditioning circuit comprising a plurality of semiconductor switches and an inductor, the inductor having a first terminal connected to a first group of the plurality of semiconductor switches and a second terminal connected to a second group of the plurality of semiconductor switches, wherein the first group of the plurality of semiconductor switches comprises a first P-type semiconductor switch and a first N-type semiconductor switch, wherein a control terminal of the first P-type semiconductor switch is controlled by a first control signal, and a control terminal of the first N-type semiconductor switch is controlled by a second control signal, wherein the first control signal and the second control signal are different control signals, wherein the first control signal and the second control signal are dependent on a driving signal from the voltage driver module, wherein the second group of the plurality of semiconductor switches comprises a second P-type semiconductor switch and a second N-type semiconductor switch, wherein a control terminal of the second P-type semiconductor switch is controlled by a third control signal, and a control terminal of the second N-type semiconductor switch is controlled by a fourth control signal, wherein the third control signal and the fourth control signal are different control signals, wherein the fourth control signal is independent of the driving signal from the voltage driver module, the initializing of the energy harvesting apparatus comprising:
carrying out the boost converter function of the reconfigurable boost/buck-boost converter by controlled switching of the plurality of semiconductor switches;
monitoring an output voltage of the power conditioning circuit; and
switching from the boost converter function to the buck-boost converter function of the reconfigurable boost/buck-boost converter by controlled switching of the plurality of semiconductor switches, when the output voltage rises to a predetermined value.

12. The method according to claim 11, comprising monitoring the output voltage and switching from the boost converter function to the buck-boost converter function with the voltage driver module comprising a voltage divider coupled to a semiconductor switch.

13. The method according to claim 12, comprising activating the semiconductor switch of the voltage driver module when a voltage drop across a resistor in the voltage divider rises to the predetermined value.

14. The method according to claim 12, further comprising receiving the driving signal from the voltage driver module and manipulating the plurality of semiconductor switches of the reconfigurable boost/buck-boost converter for operating any one of the boost converter function and the buck-boost converter function.

15. The method according to claim 12, further comprising providing a waveform variation for operating any one of the boost converter function and the buck-boost converter function with an oscillator module.

16. The method according to claim 11, wherein the energy harvesting apparatus comprises a rectifier coupled to the energy harvester, the rectifier comprising a second plurality of semiconductor switches, the method comprising:
lowering a threshold voltage of at least one of the second plurality of semiconductor switches of the rectifier with a body bias control module.

17. The method according to claim 16, wherein the second plurality of semiconductor switches of the rectifier comprises any one of P-type semiconductor switches and N-type semiconductor switches, the method comprising:
- connecting a body of the P-type semiconductor switches to electrical ground; and
- connecting a body of the N-type semiconductor switches to a reference voltage.

18. The method according to claim 17, further comprising comparing the output voltage of the power conditioning circuit to a bandgap voltage.

19. The method according to claim 18, further comprising:
- determining when the output voltage of the power conditioning circuit is larger than the bandgap voltage;
- connecting the body of the P-type semiconductor switches to the reference voltage; and
- connecting the body of the N-type semiconductor switches to electrical ground.

20. The method of claim 11,
- wherein the first P-type semiconductor switch is connected between the first terminal of the inductor and the output of the energy harvester, and the first N-type semiconductor switch is connected between the first terminal of the inductor and electrical ground;
- wherein the second P-type semiconductor switch is connected between the second terminal of the inductor and an output of the power conditioning circuit, and the second N-type semiconductor switch is connected between the second terminal of the inductor and electrical ground;
- wherein the reconfigurable boost/buck-boost converter further comprises a hysteresis comparator and a diode in parallel connection with the second P-type semiconductor switch.

* * * * *